United States Patent [19]

David

[11] 4,452,232
[45] Jun. 5, 1984

[54] SOLAR HEAT BOILER

[76] Inventor: Constant V. David, 4952 Field St., San Diego, Calif. 92110

[21] Appl. No.: 450,727

[22] Filed: Dec. 17, 1982

[51] Int. Cl.³ .............................................. F24J 3/02
[52] U.S. Cl. ...................................... 126/439; 126/451
[58] Field of Search ............... 126/438, 439, 901, 451, 126/419, 422, 424, 425

[56] References Cited

U.S. PATENT DOCUMENTS

| 1,661,473 | 3/1928 | Goddard et al. | 126/439 |
|---|---|---|---|
| 3,905,352 | 9/1975 | Jahn | 126/438 X |
| 3,927,659 | 12/1975 | Blake et al. | 126/438 |
| 4,033,118 | 7/1977 | Powell | 126/439 |
| 4,148,300 | 4/1979 | Kaufman | 126/438 X |
| 4,204,914 | 5/1980 | Diggs | 126/439 X |
| 4,335,578 | 6/1982 | Osborn et al. | 126/439 X |
| 4,343,294 | 8/1982 | Daniel | 126/451 X |
| 4,373,512 | 2/1983 | Hirt | 126/439 X |

FOREIGN PATENT DOCUMENTS

| 2552102 | 5/1976 | Fed. Rep. of Germany | 126/439 |
|---|---|---|---|
| 892397 | 12/1981 | U.S.S.R. | 126/439 |

Primary Examiner—Samuel Scott
Assistant Examiner—Margaret A. Focarino

[57] ABSTRACT

A boiler receiving solar heat from an array of reflectors arranged to concentrate the heat radiated from the sun on a small surface inside said boiler. The heated surface of the boiler being constructed to transfer the radiation heat to a cooling fluid as evenly and uniformly as possible to minimize the heated surface temperature gradients across said surface. The cooling fluid is heated in the process and used to extract energy from the sun radiations entering the boiler. The energy so extracted is channelled externally to the boiler and transformed to be used as desired in an energy producing station.

5 Claims, 5 Drawing Figures

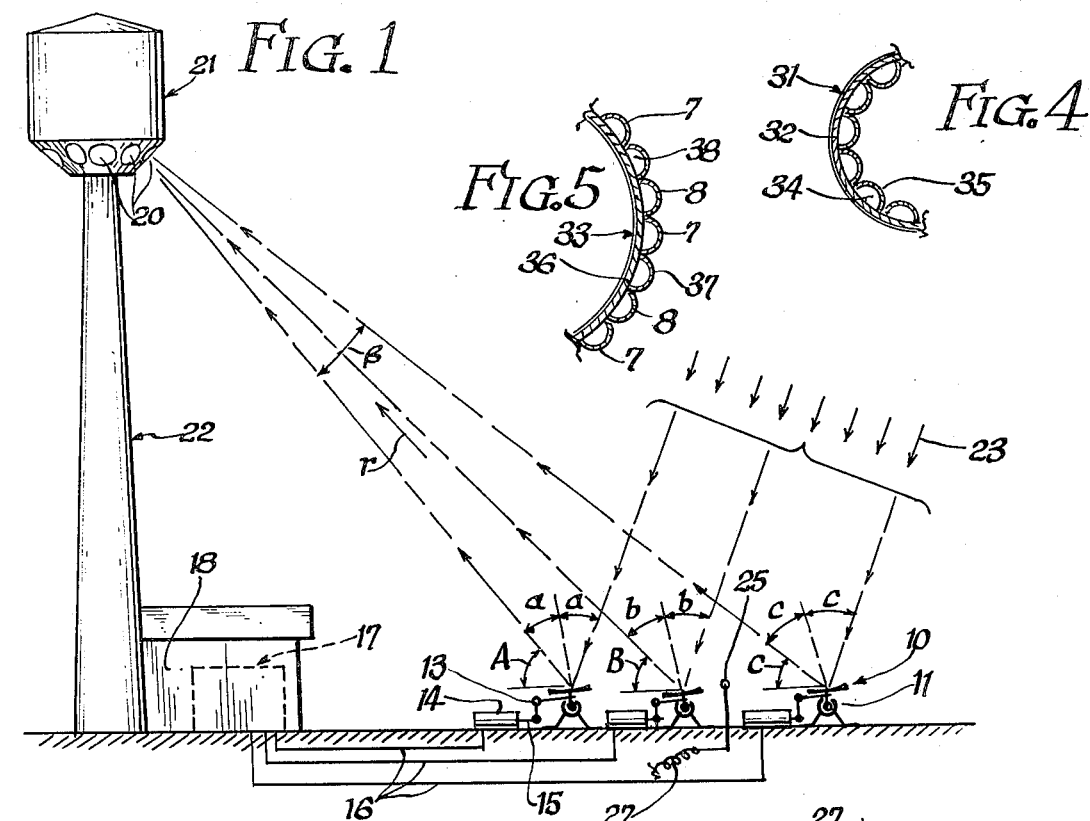
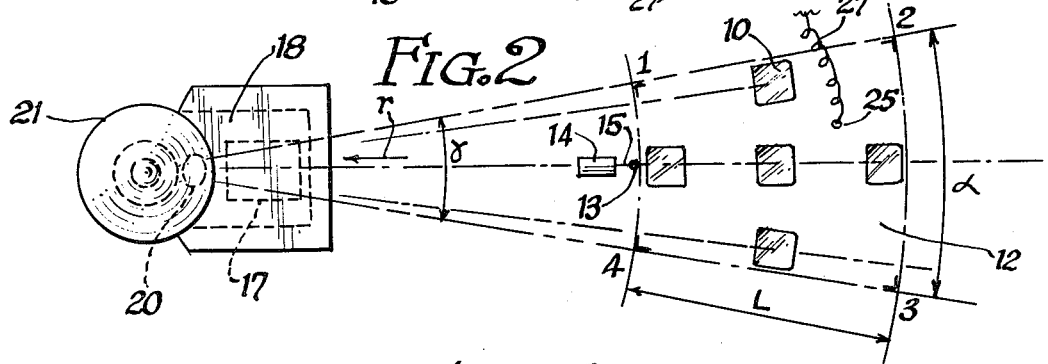
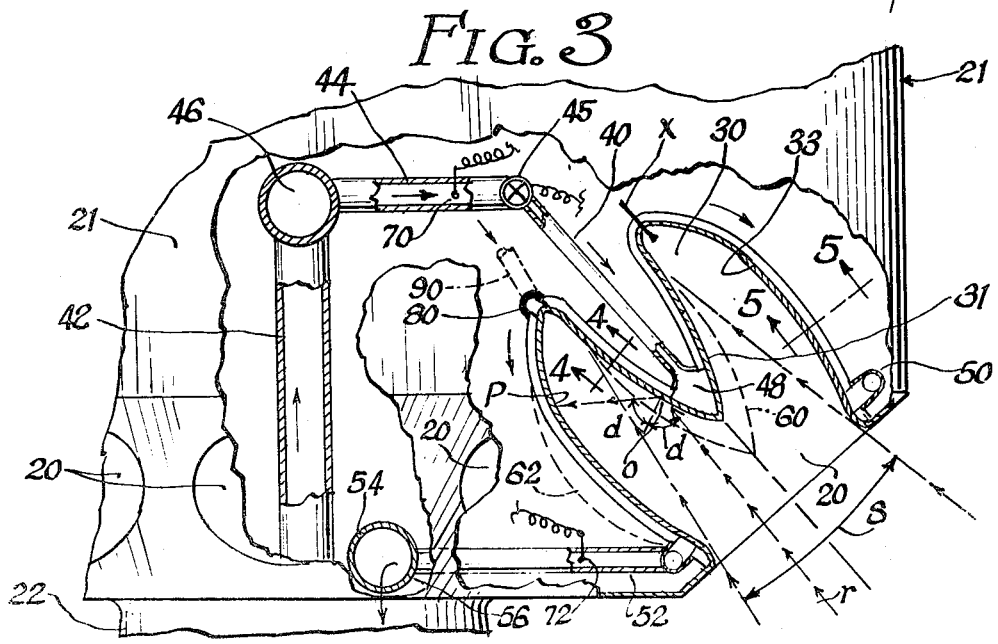

SOLAR HEAT BOILER

BACKGROUND OF THE INVENTION

The present invention relates to a solar energy extraction system to produce power in any form desired, and more particularly, to the means of extracting this energy in the most effective and efficient way through a heat exchange process.

For a long time, extracting solar radiative energy for use on a large scale has been sought and and more recently achieved by man. However, to make the process economical and competitive costwise with other means of producing energy, it has to be done on a very large scale with equipment that must operate at peak efficiency, reliably and effectively for a long time. In all systems, other than direct conversion of solar radiation into electricity, the solar rays must be collected and then concentrated on a small surface. This surface absorbs this radiation energy and it can then be used as a source of heat.

This heated surface is cooled by a fluid that keeps this surface at temperatures such that the surface supporting structure can keep its physical integrity for the lifetime of the system. The cooling fluid is heated in the process and, in so doing, extracts the radiation energy which had been absorbed by the heated surfaces exposed to the incident sun rays. A proper balance between the fluid flow and its characteristics, and the heat generated by the surface then maintains the heat exchanger structure at a constant and controlled temperature, but at its peak to maximize the operation efficiency. In most cases, to achieve the highest thermodynamic efficiency for the power generating means that uses the heat transported by the working cooling fluid, the boiler surface and structure must operate at the highest temperature that is compatible with keeping the boiler surface and structure integrity intact and undamaged.

Because it is very difficult to maintain uniform high temperatures over the heated surface of the boiler and because it has to be attached to a cooler supporting structure, one of the major difficulties encountered in building and operating such systems are created by high temperature gradients between one point and another at various locations on that surface, or between that surface and its supporting structure. Such high temperature gradients usually mean high thermal stresses which usually cause structural failures. It is therefore desirable to eliminate the cause of such temperature gradients, but still being able to operate the boiler surface at the highest possible temperatures.

SUMMARY OF THE INVENTION

It is therefore a primary object of the present invention to provide a solar heat energy extractor that can operate at high temperatures.

It is another object of the present invention to provide a solar heat energy extractor that maintains its structural integrity at such high operating temperatures.

It is still another object of the present invention to provide an improved heat exchange process between the boiler heated surface and the cooling fluid.

It is still another object of the present invention to provide the lowest temperature differentials between the hottest part of the boiler heated surface and the peak temperature reached by the cooling fluid when it leaves the boiler.

Accordingly, the present invention provides a solar heat energy extractor that is efficient, structurally reliable and effective in transferring heat from sun radiation reflectors to the cooling and working fluid from which such heat is then extracted to provide heat or power.

DESCRIPTION OF THE DRAWINGS

FIG. 1 is a simplified partial side view of a typical installation of sun ray reflectors and collectors.

FIG. 2 is a partial plan view of the solar power installation of FIG. 1.

FIG. 3 is a sectional view of one of the sun radiation energy collectors at the top of the tower shown in FIG. 1.

FIG. 4 is an enlarged fragmentary sectional view along line 4—4 of FIG. 3.

FIG. 5 is an enlarged fragmentary sectional view along line 5—5 of FIG. 3.

DETAILED DESCRIPTION OF THE INVENTION

Referring to FIGS. 1 and 2, the sun radiation energy extracting plant generally comprises sun ray reflectors 10 mounted on a spherically swivelling articulation 11. A plurality of such sun ray reflectors 10 arranged in an array 12, limited by corner points 1, 2, 3 and 4 are aimed at one of the apertures 20 of boiler cavities located in the energy collection head 21 at the top of supporting tower 22. Tower 22 is surrounded by a plurality of arrays 12, so that a large area around tower 22 can be used to reflect the incident sun rays 23. Each sun ray reflector position is determined and continuously adjusted by a linkage means 13 actuated by an actuator 14. The actuating stem 15 of actuator 14 can both move longitudinally and rotationally so that sun ray reflectors 10 can tilt in any direction on top of articulation joint 11. Each actuator 14 of sun ray reflectors 10 is monitored by signals sent through electrical circuit lines 16 connected to a master control system 17 housed in building 18. In each array 12 of sun ray reflectors, a heat or light detector 25 is located to sense and signal any local abrupt change in incident sun radiation energy, through electrical circuit lines 27, to master control system 17. Any indication of mispositioning or malfunctioning of any sun reflector 10 is also sensed by position feedback means (not shown) that is part of the operation of actuators 14.

According to both the time of day and the day of the month, or of the year, the master control system 17 is programmed to know the location of the sun in the sky (for the specific location of the power plant installation on the surface of the earth). This master control 17 can monitor this information for each sun ray reflector and direct the command signal to actuators 14 to keep all sun ray reflectors in a given array constantly reflecting the sun rays into their assigned boiler cavity aperture 20, as the sun moves in the sky. Each such aperture 20 receives the energy reflected by an array such as 12 (1-2-3-4) defined by the solid angle $\beta \rightarrow \gamma$ (angle$\alpha$ and radial length L).

Each sun ray reflector 10 is slightly concave so as to focus the light reflected from within any given array of reflectors into an area slightly smaller than aperture 20, to allow for errors of reflector position around the exact position that each reflector is supposed to assume at any given time. This means that the amount of radiative energy entering boiler cavity aperture 20 decreases from the center of the aperture to the edge of the aperture. The sun rays impinging on the various sun ray reflectors are parallel and must be reflected toward a common point at the center of aperture 20. Because of the various locations of the reflectors within an array, angles of incidence such as a, b and c of FIG. 1 vary for each reflector, as angles A, B and C are different for the same reason. Angles A, B and C are referenced to the horizontal plane that passes through the sun ray reflector center.

The internal construction of a typical boiler cavity 30 is shown in detail in FIG. 3. After entering cavity 30, through aperture 20, the reflected sun rays impinge on the inner surface 31 of the boiler cavity wall 32. Some of the impinging ray energy is absorbed and heats that surface, while the balance of the incident energy which is not absorbed by surface 31 is reflected toward the outer surface 33 of the boiler cavity wall. Most of this energy is absorbed by surface 33, although a small fraction is still reflected back toward inner surface 31, but toward a location different from where it first came.

The inner and outer surfaces of the boiler cavity are cooled by a fluid that circulates around these surfaces, externally to the boiler cavity wall. This cooling fluid is channelled through an array of ducts affixed to the boiler cavity wall. A fragmentary sectional view of this boiler cavity wall for both the inner and the outer heated surfaces 31 and 33 is shown in FIGS. 4 and 5 respectively. The cooling fluid 34 or 38 is channelled by ducts 35 or 37 that are affixed solidly to walls 32 or 36. The cooling fluid is brought in near the tip of inner surface wall 32 on the center line of boiler cavity 30 by tube 40. Each feed tube 40 is connected to a main feed duct 42 which brings in cold fluid for all the boiler cavitites. A plurality of manifolds 44 connect each feed duct 40 through a control valve 45 to a central collector 46 located at the top of main duct 42. The cooling fluid emerges in distribution chamber 48 to which cooling fluid ducts 35 are connected. The cooling fluid inlet and outlet temperatures are detected by temperature sensors 70 and 72 respectively. These temperature measurements are continuously sent to and monitored by the master control 17. The cooling fluid then flows from cooling ducts 35 into cooling ducts 37 and becomes hotter and hotter as it cools first the inner surface 31 and then the outer surface 33. The hot cooling fluid emerges near the boiler cavity aperture edge and is collected by exhaust manifold 50 which surrounds the boiler cavity entrance. Exhaust manifold 50 is connected through exhaust duct 52 to a central exhaust collector 54. The hot fluid is then ducted down through main exhaust duct 56 to the station where heat is then extracted from this hot fluid. The arrows shown in FIG. 3 indicate the fluid flow directions. All boiler cavities are similarly constructed and connected to the fluid collectors 46 and 54. The heat extraction (not shown as it is not the subject of the present invention) from the hot fluid is not described herein but could be of any of the types well known in the art.

DISCUSSION AND OPERATION

Under normal operating conditions, the amount of heat per unit area of aperture 20 contained in the reflected sun rays that enter the boiler cavity 30 varies considerably: from a small negative value (at night the boiler cavity radiates outward), or on an overcast day, to a maximum value at noon on June 21, on any very clear and sunny day around this time of the year. Therefore, the operating temperatures of the boiler cavity walls vary widely, possibly up to 2,000° F. between the minimum and maximum values. This occurs at least twice every 24 hours, although in a gradual fashion. However, when a passing cloud suddenly shields the sun rays, the temporal rate of change of these temperatures can be much larger by orders of magnitude. For practical reasons, the distribution of heat density through aperture 20 cannot remain fixed and vary slightly all the time. Finally, the cooling fluid enters fluid distribution chamber 48 at low temperatures and leaves cooling fluid ducts 37 to exit through exhaust manifold 50 at much higher temperatures. For these reasons, boiler cavity walls 32 and 36 are constantly subjected to large temperature gradients in all three orthogonal directions that are usually considered as stress planes at any point of a curved metal plate that has its edges constrained and fixed, while it is subjected to large temperature variations. Although some stainless steels have very low coefficient of thermal expansion, those are not characterized by a high tensile strength at elevated temperatures. Therefore, most of the materials suitable and usually used for the construction of the boiler cavity walls do exhibit high thermal stresses under normal operating conditions and circumstances.

The extent and the degree of the thermal stress problems can be minimized and even alleviated by the following factors:

(1) the ratio between the total boiler cavity wall heated surface area and the area of the boiler cavity aperture;

(2) the shape and nature of both the inner and outer heated surfaces and supporting structures;

(3) the amount of heat absorbed per unit area of the inner and outer heated surfaces;

(4) the amount of heat removed per unit area of the inner and outer heated surfaces by the cooling fluid;

(5) the amount of heat transmitted per unit area along the inner and outer heated surfaces and their supporting structural walls (heat not removed by the cooling fluid where this heat is generated) and which leads to thermal stresses; and (6) the percentage of the area of the heated surface supporting structural walls which is directly cooled by the cooling fluid.

For any combination of cooling fluid nature and boiler cavity structural wall, the six factors listed above interact as follows, with the resulting effects mentioned below:

(1) Factor 1 above influences directly the thermodynamic efficiency of the energy producing station, which in turn, affects the economics of the overall operation and the cost of the energy produced;

(2) Factors 2, 3 and 4 individually or collectively directly influence the level to which Factor 1 can be safely pushed;

(3) Factors 5 and 6 directly influence individually or collectively Factor 1 and indirectly influence Factors 3 and 4; and (4) all six factors interact with each other on a less direct and meaningful manner in such a way that a change in any of these factors does affect the others adversely for any optimum design arrived at to meet a given objective (unit cost of the energy generated by the station).

The present invention, as described hereinafter, shows how such an objective can be more easily reached. To that effect, the construction of the invention provides:

(1) a high ratio of heated surfaces 31 and 33 to boiler cavity outer volume;

(2) the means to insure the most uniform temperature distribution in any direction along heated surfaces 31 and 33;

(3) the possibility to obtain the highest temperature for the cooling fluid at its exhaust point;

(4) a safe and reliable operation that requires no moving parts and the simplest assembling possible of as fewer and simplest parts as possible; and (5) a quick way to adjust or shut off the cooling fluid flow into the cooling fluid ducts 35 of any boiler cavity as soon as an abrupt change in the level of sun ray energy has taken place in the array of reflectors that operate this specific boiler cavity.

By necessity, the incident reflected sun rays converge through a solid angle $\delta$ upon the central part of the boiler cavity. The cross-sectional area of that converging cone of energy flux becomes smaller and smaller as it penetrates deeper and deeper into the boiler cavity, past its aperture 20. The amount of energy per unit of area of any surface on which it impinges, for any given incident energy flux, depends on:

(1) the angle at which the reflected sun rays reach any point such as 0 (FIG. 3), angle of incidence of sun ray r; and (2) the degree of sun light absorptivity (or reflectivity) of that heated surface at point 0.

In turn, the degree of sun light reflectivity depends upon:

(1) the nature of the surface coating on the wall of the boiler cavity (heated surface);

(2) the external texture of that coating;

(3) the coating operating temperature; and (4) the angle of incidence of the sun light.

Therefore, the amount of incident radiative energy which is either absorbed or reflected at point 0 can be adjusted and determined, for any operating temperature, by design and construction through the use of the following parameters:

(1) the geometry of the inner heated surface and of its supporting structural wall, which determines the angle of incidence of the sun rays coming in;

(2) the nature of the heated surface coating (basic reflectivity coefficient); and (3) the texture given to its finish, which determines the amount of diffracted radiation, i.e. which is not reflected directly along one single line as per the laws of geometrical optics, but scattered away from the theoretical line defined above.

The energy that is not absorbed at point 0 by the inner surface is then reflected, either directly or with a certain degree of scattering, to point P located on the outer heated surface 33 of the boiler cavity wall 36. The amount of energy impinging per unit area of surface 33 at point P for that specific sun ray that is reflected from point 0 is less than it is when it leaves point 0, because the inner surface is convex (the reflected sun rays diverge from point 0) and because the outer heated surface has a total area much larger than the inner heated surface. This achieves two dependent things:

(1) the outer heated surface receives a more uniformly distributed energy flux; and (2) the heat flux level received by unit area is much lower than that which is received per unit of area of the inner surface.

It is desirable to have both heated surfaces operating at temperatures that are not too different, as discussed previously. That can be easily done by using coating materials with finish textures that provide a degree of reflectivity which is maximum at the tip of the inner heated surface, remains high but still decreases as one progresses toward the base of the inner heated surface 31, where it connects with the base of the outer heated surface 33. Then, starting at junction X of the inner and outer heated surfaces 31 and 33, the nature of the coating material changes and it is replaced by a type of coating that is characterized by a low reflectivity and, consequently, high absorptivity. Depending upon the geometry of both the inner and outer heated surfaces, in order to keep the amount of radiation energy absorbed per unit area as constant as possible from point X to near the location where the cooling fluid ducts 37 connect with exhaust manifold 50, the degree of absorptivity of the coating can be adjusted as was previously explained above in the case of the coating on the inner surface. The geometries of both the inner and the outer heated surfaces can be changed from the shapes depicted in FIG. 3. If deemed more appropriate and desirable, the contours of both surfaces could be constructed to assume the shapes shown by broken lines 60 and 62 of FIG. 3. It is pertinent to point out that the way the sun rays are reflected from both heated surfaces keeps the amount of energy reradiated outside through aperture 20 to a minimum. The amount of heat loss from the boiler cavities is therefore minimized.

Another very influential construction parameter provided by the present invention is the distribution, size and cross-section shape of the cooling fluid ducts 35 and 37. The amount of heat removed per unit area of the inner and outer heated surfaces, for a given steady state operating temperature, depends upon the following:

(1) the physical state of the cooling fluid (liquid phase, liquid/vapor phase or vapor/gas phase);

(2) the velocity of the cooling fluid in the ducts;

(3) the geometry and size of the duct cross-sections; and (4) the ratio between the area of the boiler cavity wall that is directly in contact with the cooling fluid and the total area of the boiler cavity wall to be cooled.

FIGS. 4 and 5 show similar sizes, geometries and degrees of coverage of these cooling fluid ducts for both the inner and outer surface walls. It need not be so and to illustrate the point, one could visualize 2 out of every 3 ducts 37 being removed from wall 36, such as those identified as 7 and 8 in FIG. 5. Also, a collector such as that which is identified as 80 in FIG. 3 could be located between the inner surface wall cooling ducts and those on the outer surface wall, in order to provide a redistribution of the cooling fluid flow. In other words, the number and size of the cooling ducts on both surfaces do not have to correspond.

The efficiency of the heat transfer process between walls 32 and 36 and the cooling fluid inside ducts 35 and 37 also depends upon the differences between the surface temperatures of the sides of these walls that are in contact with the cooling fluid and the cooling fluid temperature, inside ducts 35 and 37. If too high, these temperature differences adversely influence the heat transfer efficiency. Therefore, it could be that, for most boiler cavity geometries, the lowest boiler cavity wall temperatures are at line X where the inner and outer surfaces connect. In such a case, the cooling fluid could be introduced in collecting manifold 80, through inlet duct 90 so that the cooling fluid can flow at the same time, both into the inner and outer surfaces cooling ducts, then exit through collectors 48 and 50 respectively. In that case, the cooling fluid flow direction would be reversed inside the inner surface cooling ducts 35. In addition, the amounts of cooling fluid flowing in each direction from collecting manifold 80 can be different and made adjustable separately through a valving system (not shown) inserted in ducts 52 and 62. This added construction feature provides the last means needed to optimize the boiler cavity operation, under any operating conditions of the sun ray reflectors.

The various embodiments of the present invention discussed above then result in a boiler cavity construction that provides the means to realize the optimum design conditions and operating conditions required to achieve: the high thermodynamic efficiency, the simplicity of construction, and the maximum use of the sun ray energy that enters the boiler cavity. The latter is achieved by minimizing the the amount of reradiated energy out of the boiler cavity. Although, in general, the sun energy is free, the sun radiation energy collected by the reflectors 10 and that enters through apertures 20 is not. Therefore, great care must be taken neither to lose any of it nor to squander it by not using it effectively and completely. A judicious and ideally proportioned combination of the construction features available with these various embodiments provides the means to reach this objective.

Having thus described my invention, I claim:

1. A boiler cavity comprising:
   means for supplying concentrated sun radiation energy inside the boiler cavity;
   means for distributing the incoming radiation energy throughout the boiler cavity;
   means for depositing this incoming radiation energy evenly on the walls of the boiler cavity;
   means for maintaining the temperatures of the wall of the boiler cavity almost equal at all locations on that wall;
   a central section of boiler cavity wall for directly receiving the sun radiation;
   a peripheral section of boiler cavity wall for receiving indirectly the sun radiation;
   means for providing that central section surface facing the incoming radiation energy to have a high reflectivity;
   means for providing that peripheral section surface facing the central section to have a high absorptivity;
   means for providing the removal of the heat deposited on the wall of the boiler cavity by a cooling fluid to be used elsewhere;
   means for monitoring the cooling fluid flow to match the heat removal needed to keep the temperatures of the boiler cavity wall equal; and
   means for introducing and collecting the cooling fluid at locations on the boiler cavity wall such that the temperature differences between the cooling fluid and the boiler cavity wall are kept constant and close to the values required to insure maximum efficiency of the heat transfer process that takes place.

2. A boiler cavity according to claim 1 including an external system for adjusting and regulating the cooling fluid into and out of the boiler cavity cooling ducts to match the radiation energy amount entering the boiler cavity.

3. A boiler cavity according to claim 2 wherein:
   means is provided to maximize the energy output of the boiler cavity, thereby minimizing the production cost of such energy;
   means is provided to maximize the operation peak temperature of the working cooling fluid; and
   means is provided to minimize the operating peak temperature of the boiler cavity wall.

4. A boiler cavity according to claim 3 wherein the heat loss through air convection in and out of the boiler cavity is minimized.

5. A boiler cavity according to claim 3 wherein the degree of air ionization, and loss of heat thereby, inside the boiler cavity is minimized.

* * * * *